(12) United States Patent
Barr, Jr.

(10) Patent No.: US 7,929,373 B2
(45) Date of Patent: Apr. 19, 2011

(54) METHOD OF WAVEFIELD EXTRAPOLATION FOR SINGLE-STATION, DUAL-SENSOR TOWED STREAMER SIGNALS

(75) Inventor: Frederick James Barr, Jr., Pearland, TX (US)

(73) Assignee: PGS Geophysical AS, Lysaker (NO)

( * ) Notice: Subject to any disclaimer, the term of this patent is extended or adjusted under 35 U.S.C. 154(b) by 252 days.

(21) Appl. No.: 12/313,317

(22) Filed: Nov. 19, 2008

(65) Prior Publication Data
US 2010/0124149 A1    May 20, 2010

(51) Int. Cl.
*G01V 1/38* (2006.01)
*G01V 1/36* (2006.01)
(52) U.S. Cl. ............................. 367/24; 367/21
(58) Field of Classification Search .................... 367/21, 367/24
See application file for complete search history.

(56) References Cited

U.S. PATENT DOCUMENTS

| 7,359,283 B2 | 4/2008 | Vaage et al. |
| 7,616,523 B1 * | 11/2009 | Tabti et al. ................ 367/24 |
| 2008/0192571 A1 | 8/2008 | Vaage et al. |

OTHER PUBLICATIONS

Lasse Amundsen, "Wavenumber-based filtering of marine point-source data", Geophysics, vol. 58, No. 9, Sep. 1993, p. 1335-1348.

* cited by examiner

*Primary Examiner* — Ian J Lobo
(74) *Attorney, Agent, or Firm* — E. Eugene Thigpen; Charles R. Schweppe (57) ABSTRACT

A time-dependent arrival angle is determined at a single receiver station in a towed streamer. Up-going and down-going pressure wavefields are calculated from pressure and vertical particle velocity wavefields measured at the receiver station. Extrapolated up-going and down-going pressure wavefields are generated from the up-going and down-going pressure wavefields displaced by a time delay based upon the time-dependent arrival angle.

10 Claims, 10 Drawing Sheets

---

Determine time-dependent arrival angle at single receiver station in towed streamer — 10

Calculate up-going and down-going pressure wavefields from pressure and vertical particle velocity wavefields measured at receiver station — 11

Generate extrapolated up-going and down-going pressure wavefields from up-going and down-going pressure wavefields displaced by time delay based upon time-dependent arrival angle — 12

METHOD OF WAVEFIELD EXTRAPOLATION FOR SINGLE-STATION, DUAL-SENSOR TOWED STREAMER SIGNALS

CROSS-REFERENCES TO RELATED APPLICATIONS

Not Applicable

FEDERALLY SPONSORED RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of wavefield extrapolation in dual-sensor marine seismic streamer signals.

2. Description of the Related Art

In the oil and gas industry, geophysical prospecting is commonly used to aid in the search for and evaluation of subterranean formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downward into the subsurface of the earth. In a marine seismic survey, the seismic signal may also travel downward through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors (also called seismic receivers) at or near the surface of the earth, in an overlying body of water, or at known depths in boreholes and recorded.

The resulting seismic data obtained in performing a seismic survey is processed to yield information relating to the geologic structure and properties of the subterranean formations in the area being surveyed. The processed seismic data is processed for display and analysis of potential hydrocarbon content of these subterranean formations. The goal of seismic data processing is to extract from the seismic data as much information as possible regarding the subterranean formations in order to adequately image the geologic subsurface. In order to identify locations in the Earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in depth or time.

The image of the structure of the Earth's subsurface is produced in order to enable an interpreter to select locations with the greatest probability of having petroleum accumulations. To verify the presence of petroleum, a well must be drilled. Drilling wells to determine whether petroleum deposits are present or not, is an extremely expensive and time-consuming undertaking. For that reason, there is a continuing need to improve the processing and display of the seismic data, so as to produce an image of the structure of the Earth's subsurface that will improve the ability of an interpreter, whether the interpretation is made by a computer or a human, to assess the probability that an accumulation of petroleum exists at a particular location in the Earth's subsurface.

The appropriate seismic sources for generating the seismic signal in land seismic surveys may include explosives or vibrators. Marine seismic surveys typically employ a submerged seismic source towed by a ship and periodically activated to generate an acoustic wavefield. The seismic source generating the wavefield may be of several types, including a small explosive charge, an electric spark or arc, a marine vibrator, and, typically, a gun. The seismic source gun may be a water gun, a vapor gun, and, most typically, an air gun. Typically, a marine seismic source consists not of a single source element, but of a spatially-distributed array of source elements. This arrangement is particularly true for air guns, currently the most common form of marine seismic source. In an air gun array, each air gun typically stores and quickly releases a different volume of highly compressed air, forming a short-duration impulse.

The appropriate types of seismic sensors typically include particle velocity sensors, particularly in land surveys, and water pressure sensors, particularly in marine surveys. Sometimes particle displacement sensors, particle acceleration sensors, or pressure gradient sensors are used in place of or in addition to particle velocity sensors. Particle velocity sensors and water pressure sensors are commonly known in the art as geophones and hydrophones, respectively. Seismic sensors may be deployed by themselves, but are more commonly deployed in sensor arrays. Additionally, pressure sensors and particle velocity sensors may be deployed together in a marine survey, collocated in pairs or pairs of spatial arrays.

In a typical marine seismic survey, a seismic survey vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected locations. Seismic streamers, also called seismic cables, are elongate cable-like structures towed in the body of water by the seismic survey vessel that tows the seismic source or by another seismic survey ship. Typically, a plurality of seismic streamers is towed behind a seismic vessel.

When the air-gun array is fired, an impulse sound wave travels down through the water and into the earth. At each interface where the type of rock changes, a portion of that sound wave is reflected back toward the surface and back into the water layer. After the reflected wave reaches the streamer cable, the wave continues to propagate to the water/air interface at the water surface, from which the wave is reflected downwardly, and is again detected by the hydrophones in the streamer cable. The water surface is a good reflector and the reflection coefficient at the water surface is nearly unity in magnitude and is negative in sign for pressure waves. The pressure waves reflected at the surface will thus be phase-shifted 180 degrees relative to the upwardly propagating waves. The downwardly propagating wave recorded by the receivers is commonly referred to as the surface reflection or the "ghost" signal. Because of the surface reflection, the water surface acts like a filter, which creates spectral notches in the recorded signal, making it difficult to record data outside a selected bandwidth. Because of the influence of the surface reflection, some frequencies in the recorded signal are amplified and some frequencies are attenuated.

Maximum attenuation of the pressure wave occurs at frequencies for which the propagation distance between the detecting hydrophone and the water surface is equal to one-half wavelength. Maximum amplification occurs at frequencies for which the propagation distance between the detecting hydrophone and the water surface is one-quarter wavelength. The wavelength of the acoustic wave is equal to the velocity divided by the frequency, and the velocity of an acoustic wave in water is about 1500 meters/second. Accordingly, the location in the frequency spectrum of the resulting spectral notch is readily determinable. For example, for a seismic streamer at a depth of 7 meters, and waves with vertical incidence, maximum attenuation occurs at a frequency of about 107 Hz and maximum amplification occurs at a frequency of about 54 Hz.

A particle motion sensor, such as a geophone, has directional sensitivity, whereas a pressure sensor, such as a hydrophone, does not. Accordingly, the upgoing wavefield signals detected by a geophone and hydrophone located close together will be in phase, while the downgoing wavefield signals will be recorded 180 degrees out of phase. Various techniques have been proposed for using this phase difference to reduce the spectral notches caused by the surface reflection and, if the recordings are made on the seafloor, to attenuate water borne multiples. It should be noted that an alternative to having the geophone and hydrophone co-located, is to have sufficient spatial density of sensors so that the respective wavefields recorded by the hydrophone and geophone can be interpolated or extrapolated to produce the two wavefields at the same location.

It is well known in the art that pressure and particle motion signals can be combined to derive both the up-going and the down-going wavefield. For sea floor recordings, the up-going and down-going wavefields may subsequently be combined to remove the effect of the surface reflection and to attenuate water borne multiples in the seismic signal.

Conventional 3D marine seismic acquisition by towed streamer usually results in asymmetrical spatial sampling and fold between inline and cross-line directions. The sampling density is denser in the inline direction (parallel to the towed streamers) than in the cross-line direction (perpendicular to the towed streamers). The asymmetry is due to a wider spacing between receivers in separate streamers than between receivers in the same streamer. This asymmetry can lead to spatial aliasing of the sampling data in the cross-line direction. The aliasing interferes with conventional efforts to combine the pressure and particle motion signals to derive the up-going and down-going wavefields.

Conventionally, changing seismic data recorded from a dual-sensor streamer, towed at a receiver depth of $z_r$ meters, to another depth, z, would entail the following steps. The pressure (hydrophone) and vertical particle velocity (geophone) traces h and g, respectively, would be corrected for impulse response differences between the two types of detectors. The corrected pressure and vertical particle velocity traces contained in a common-shot gather are then transformed into the frequency-wavenumber ("FK") domain, yielding H and G, respectively. The transformations can be done by any well-known FK transform, such as, for example, Fourier transforms. The vertical particle velocity trace amplitudes would be corrected for non-vertical arrivals of seismic waves as taught by Amundsen (in his 1993 article in Geophysics, Vol. 58, No. 9, p. 1335-1348) and, if necessary, tow noise, as taught by Vaage et al. (in their 2004 patent, U.S. Pat. No. 7,359,283 B2), yielding $G_c$. The upward traveling pressure wave field, U, and the downward traveling pressure wave field, D, would be computed in the FK domain, using the equations:

$$U = \frac{H - G_c}{2} \quad (1)$$

and $$D = \frac{H + G_c}{2}. \quad (2)$$

Then, the up-going and down-going wavefields U and D from Equations (1) and (2), respectively, are extrapolated from receiver depth $z_r$ to another depth z to new up-going and down-going wavefields $U_{new}$ and $D_{new}$, respectively, using the equations;

$$U_{new} = U \exp[+ik_z(z_r - z)] \quad (3)$$

and $$D_{new} = D \exp[-ik_z(z_r - z)]. \quad (4)$$

Here, $i = \sqrt{-1}$ is the imaginary unit and $k_z$ is a vertical wavenumber given by:

$$k_z = \sqrt{\left(\frac{\omega}{c}\right)^2 - k_x^2 - k_y^2}, \quad (5)$$

where $k_x$ is a horizontal wavenumber, in the streamer (inline) direction, computed by the FK transform; $k_y$ is a horizontal wavenumber, in the cross-streamer (cross-line) direction, also computed by the FK transform; ω is radian frequency; and c is acoustic wave propagation velocity in water. Finally, these new corrected wavefields $U_{new}$ and $D_{new}$ from Equations (3) and (4), respectively, are inverse-transformed back to the space-time domain. Note that signals in the time domain are denoted by lower case letters, while the same signals in the frequency domain are denoted by the corresponding capital letters.

This conventional wavefield correction is accurate, but depends upon all the receiver stations being towed at the same depth and the recording geometry being such that the traces comprising a common-shot record are not spatially aliased in the x or y dimensions. If either of these assumptions is violated, the results of the above described operation are compromised.

Thus, a need exists for a method for extrapolating up-going and down-going wavefields in dual-sensor seismic streamer data from a single receiver station, which accounts for vertical (depth) variation and horizontal spatial aliasing of the receiver positions.

BRIEF SUMMARY OF THE INVENTION

The invention is a method for wavefield extrapolation in a dual-sensor towed streamer. A time-dependent arrival angle is determined at a single receiver station in the towed streamer. Up-going and down-going pressure wavefields are calculated from pressure and vertical particle velocity wavefields measured at the receiver station. Extrapolated up-going and down-going pressure wavefields are generated from the up-going and down-going pressure wavefields displaced by a time delay based upon the time-dependent arrival angle.

BRIEF DESCRIPTION OF THE DRAWINGS

The invention and its advantages may be more easily understood by reference to the following detailed description and the attached drawings, in which.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The method of the invention performs wavefield extrapolation that is accurate for the reflection waves contained in the recorded data and approximately accurate for other seismic events such as multiple reflections.

Figure 1:
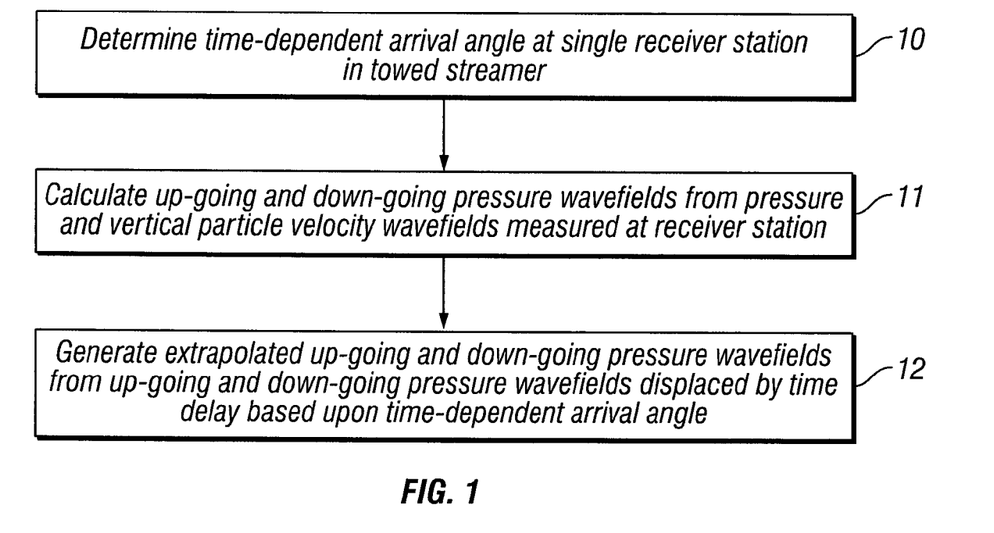
FIG. 1 is a flowchart illustrating an embodiment of the invention for wavefield extrapolation in dual-sensor towed streamers.
Figure 2:
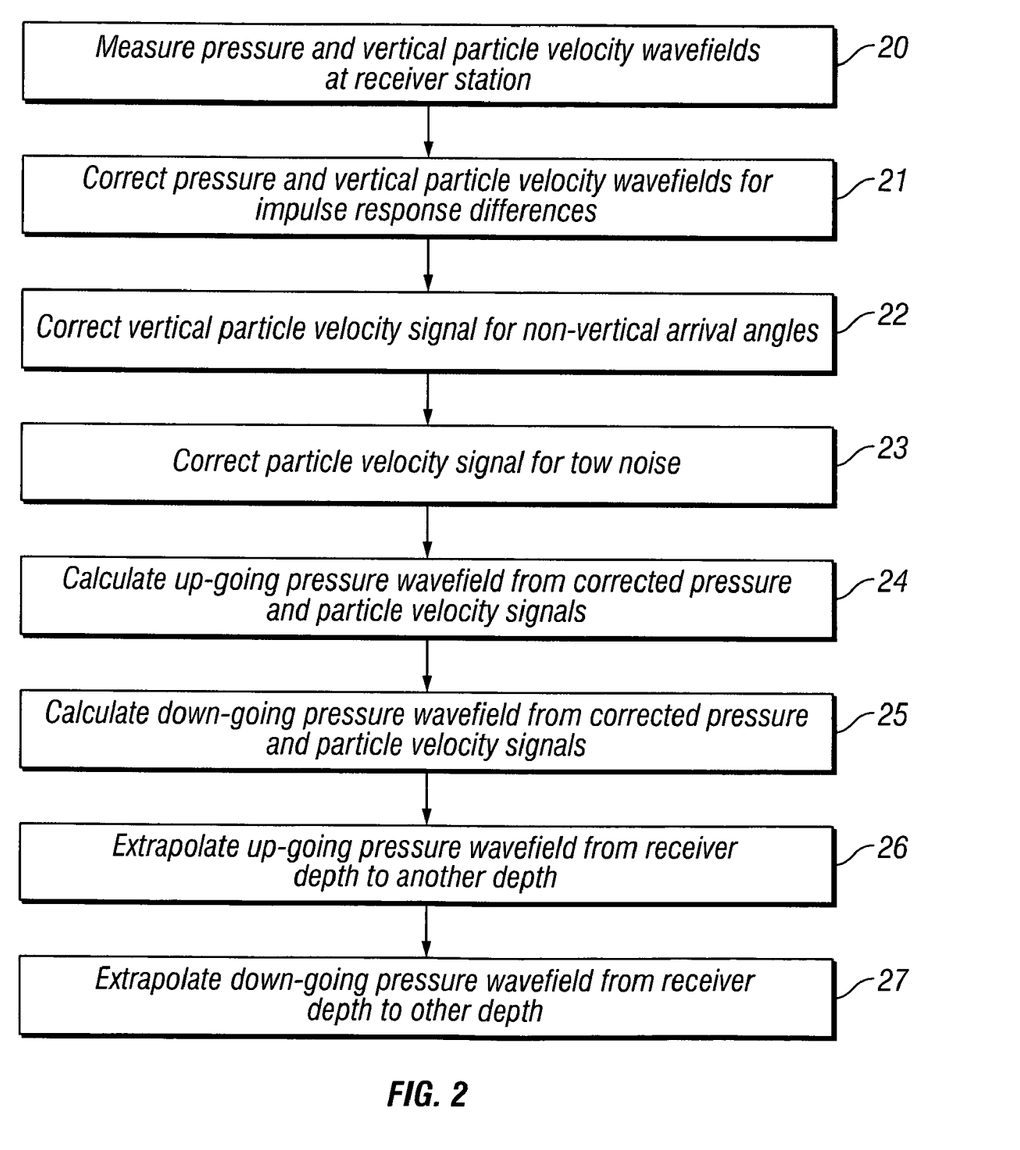
FIG. 2 is a flowchart illustrating another embodiment of the invention for wavefield extrapolation in dual-sensor towed streamers.
Figure 9:
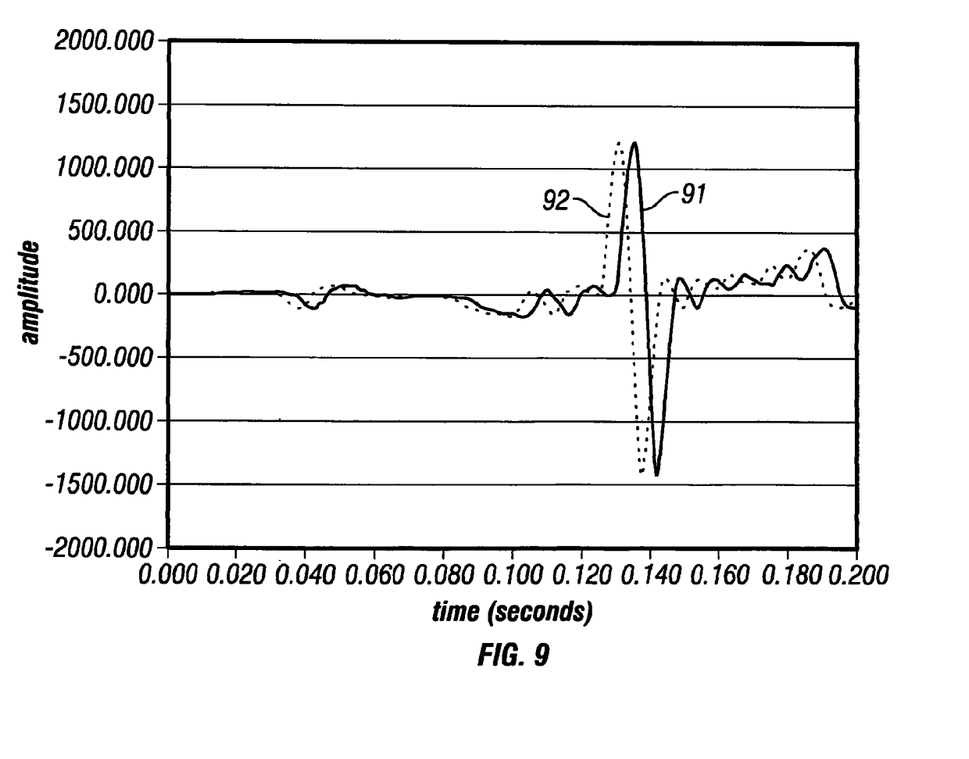
FIG. 9 is a plot of an extrapolated down-going pressure wavefield constructed according to the method of the invention.
Figure 10:
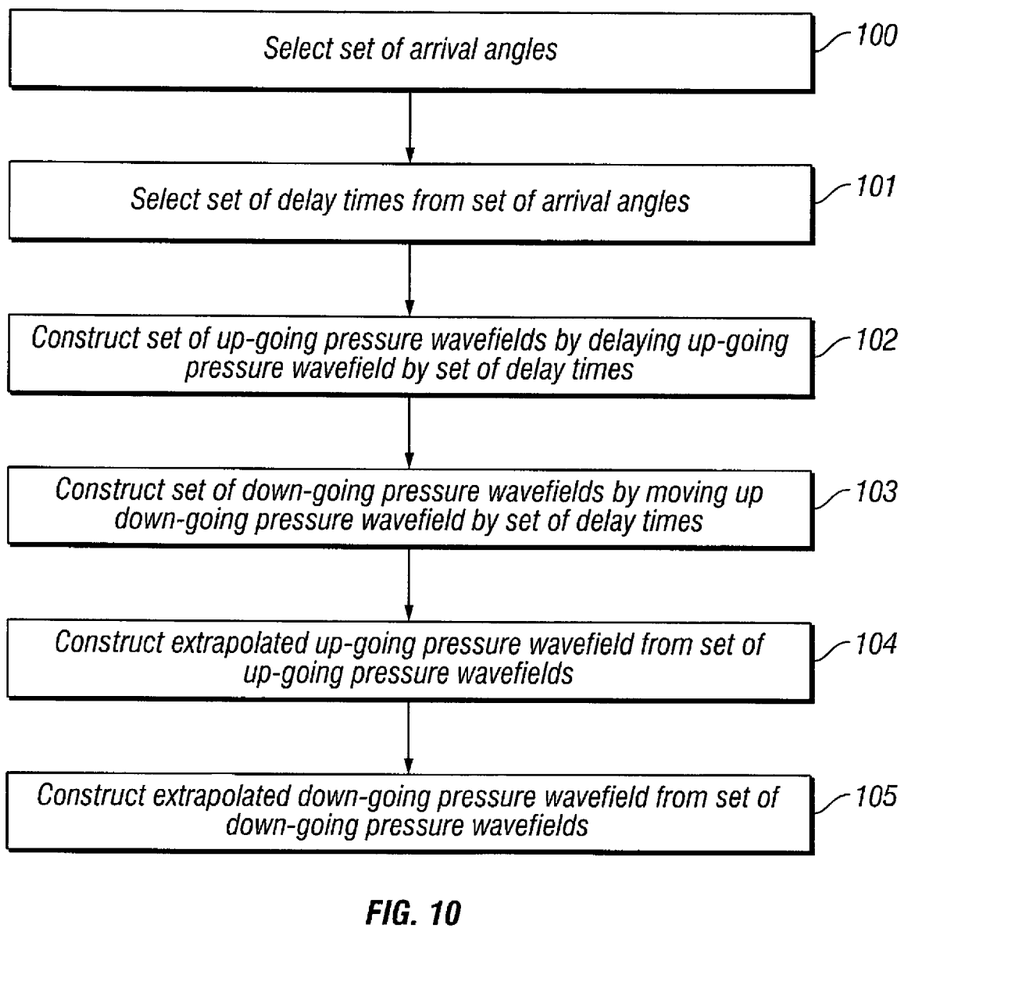
FIG. 10 is a flowchart illustrating an embodiment of the invention for constructing extrapolated up-going and down-going pressure wavefields.
Figure 11:
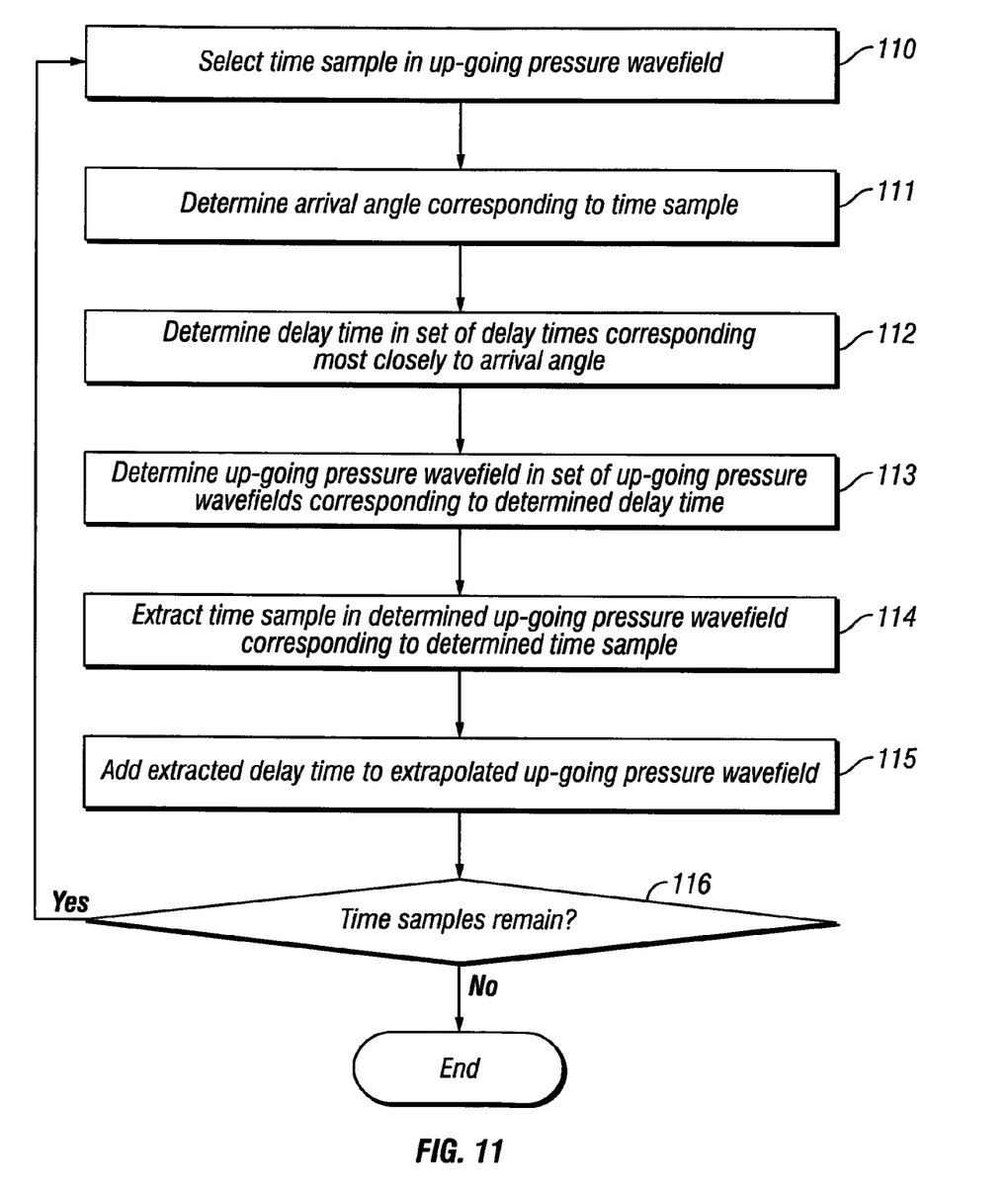
FIG. 11 is a flowchart illustrating an embodiment of the invention for constructing an extrapolated up-going pressure wavefield.
Figure 12:
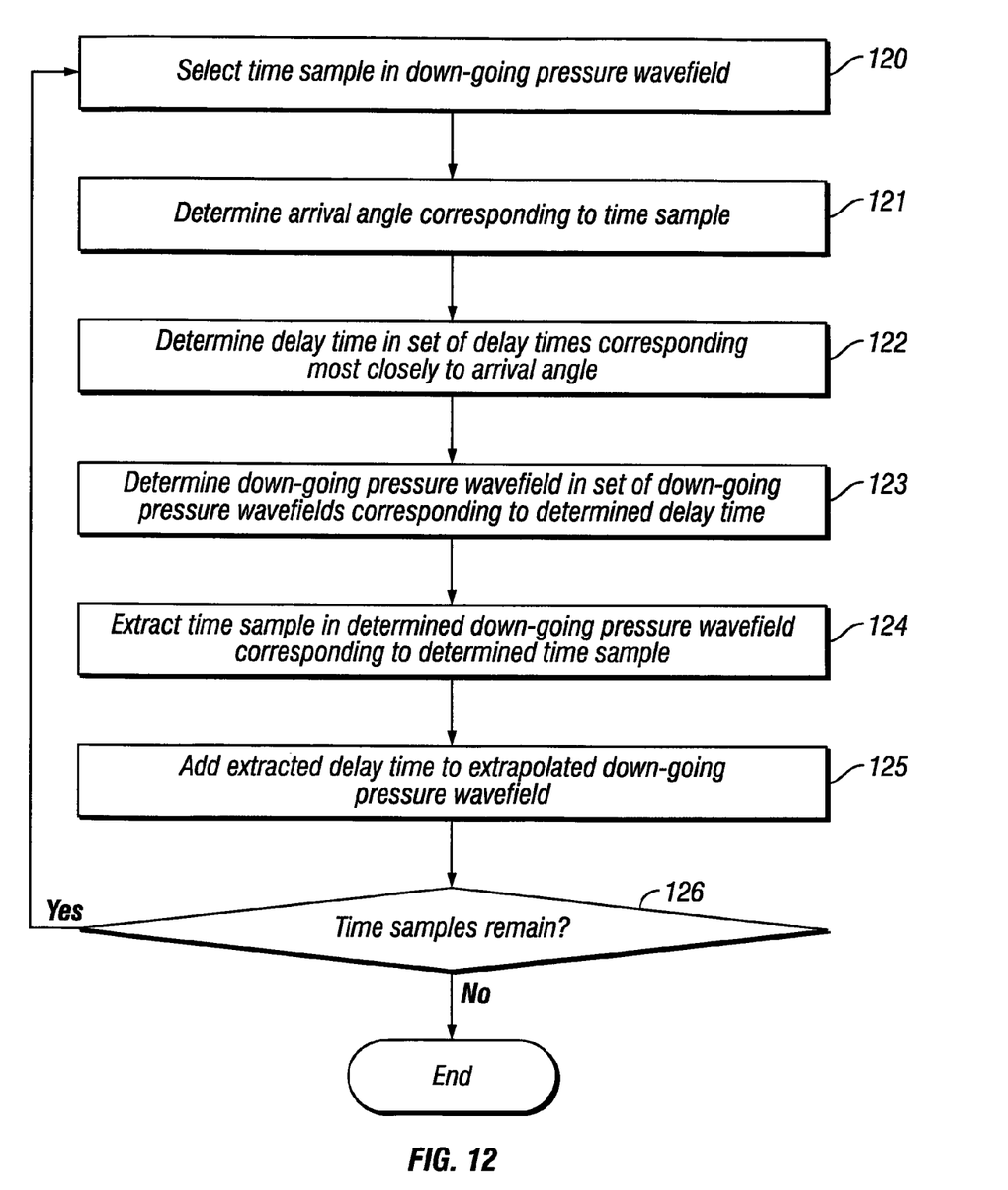
FIG. 12 is a flowchart illustrating an embodiment of the invention for constructing an extrapolated down-going pressure wavefield.

FIGS. 1-2 and 10-12 show flowcharts illustrating embodiments of the invention for extrapolating wavefields in dual-sensor seismic streamer data at a single receiver station. FIG. 1 is a flowchart illustrating a general embodiment of the invention. FIG. 2 is a flowchart further illustrating a more particular embodiment of the invention as described in FIG. 1. FIGS. 10-12 are flowcharts illustrating details of the extrapolation process in FIGS. 1-2. FIGS. 3-9 show plots and views that illustrate the embodiments of the invention discussed with reference to the flowcharts in FIGS. 1-2 and 10-12.

FIG. 1 is a flowchart illustrating an embodiment of the invention for wavefield extrapolation in dual-sensor towed streamers. At block 10, a time-dependent arrival angle is determined at a single receiver station. At block 11, up-going and down-going pressure wavefields are calculated from pressure and vertical particle velocity wavefields measured at the receiver station. At block 12, extrapolated up-going and down-going pressure wavefields are generated from the up-going and down-going pressure wavefields displaced by a time delay based upon the time-dependent arrival angle.

FIG. 2 is a flowchart illustrating another embodiment of the invention for wavefield extrapolation in dual-sensor towed streamers. FIG. 2 illustrates in more detail the portion of the invention discussed in blocks 11 and 12 of FIG. 1, above.

At block 20, a pressure signal h(t) and a vertical particle velocity signal g(t) are recorded at a single receiver station in a dual-sensor towed streamer. The pressure signals and vertical particle velocity signals are usually recorded by pressure sensors such as hydrophones and vertical particle velocity sensors such as vertical geophones, respectively. However, it is within the scope of the invention that other types of seismic sensors be employed in the invention. Thus, for generality, the recorded signals will be referred to as pressure signals rather than pressure sensor signals and as particle velocity signals rather than particle velocity sensor signals. The other types of seismic sensors could include, but are not limited to, multi-directional particle velocity sensors, particle displacement sensors, particle acceleration sensors, or pressure gradient sensors being used in place of or in addition to vertical particle velocity sensors. The pressure and vertical particle velocity sensors may be deployed by themselves, but are more commonly deployed in sensor arrays. Additionally, the pressure sensors and particle velocity sensors are typically positioned together in the streamers, collocated in pairs of the two sensors or in pairs of arrays of the two sensors.

The method of the invention employs particle motion sensors that are responsive to motions in the particles of the medium to which the motion sensors are coupled, typically water. In general, particle motion sensors may be responsive to the displacement of the particles, the velocity of the particles, or the acceleration of the particles in the medium. Particle velocity sensors are typically employed and so are used to illustrate the present invention. If motion sensors are used which are -responsive to position, then the position signal is preferably differentiated to convert it to a velocity signal, by computational means well known in the art. If motion sensors are used which are responsive to acceleration (such as accelerometers), then the acceleration signal is preferably integrated to convert it to a velocity signal, by computational means well known in the art.

At block 21, the pressure signal, h(t), and the vertical particle velocity signal, g(t), from block 20 are optionally corrected, if deemed necessary, for impulse response differences between the pressure signal sensor and the vertical particle velocity signal sensor, generating a corrected pressure signal, $h_{cor}(t)$, and a corrected vertical particle velocity signal, $g_{cor}(t)$, respectively.

This correction for relative differences in the instrument transfer functions correspond to instrument impulse responses in the time domain. In one embodiment, these corrections could be correcting the amplitude and phase of the pressure signals to match the particle velocity signals, or, in an alternative embodiment, correcting the particle velocity signals to match the pressure signals, or, in a further alternative embodiment, correcting both data sets to a common basis. Correcting for relative differences in instrument impulse responses is well known in the art. Finally, an amplitude scaling equal to the acoustic impedance in the water is preferably applied to the particle velocity signals to correct for the relative differences in amplitudes of pressure and particle velocity. This is also well known in the art.

At block 22, the corrected vertical particle velocity signal, $g_{cor}$, from block 21 is corrected for non-vertical arrival angles of the reflected seismic waves, generating a corrected vertical particle velocity signal, $g_{ang}$. Two methods for determining the vertical arrival angle of reflection events at any receiver station of a dual-sensor streamer are described in two co-pending patent applications. One method uses velocity functions for reflections in the survey area, while the other method uses cross-ghosting analyses of the pressure and vertical particle velocity traces recorded at that receiver station. Both of these methods yield the arrival angles as a function of time, $\phi(t)$, for a given single receiver station.

The first method is described in co-pending U.S. patent application Ser. No. 12/221,255, "Method of Summing Dual-Sensor Streamer Signals Using Seismic Reflection Velocities", filed Aug. 1, 2008 by the inventor of the present invention and assigned to an affiliate company of the assignee of the present invention. Barr describes a method for attenuating low frequency noise in dual-sensor towed streamer signals by combining pressure signals and vertical particle velocity signals. A merged particle velocity signal is generated by merging a recorded vertical particle velocity signal, scaled in an upper frequency range using a time-dependent arrival angle as determined by velocity analysis, with a simulated particle velocity signal, calculated in a lower frequency range from a recorded pressure signal using a time-varying filter based on the time-dependent arrival time. Combined pressure and vertical particle velocity signals are generated by combining the recorded pressure and merged particle velocity signals.

The second method is described in co-pending U.S. patent application Ser. No. 12/231,117, "Method of Summing Dual-Sensor Streamer Signals Using Cross-Ghosting Analysis", filed Aug. 28, 2008, including as co-inventor the inventor of the present invention and assigned to an affiliate company of the present invention. Barr et al. describe a method for combining pressure signals and vertical particle velocity signals in dual-sensor towed streamers. A merged particle velocity signal is generated by combining a recorded vertical particle velocity signal, scaled in an upper frequency range using a time-dependent arrival angle as determined by cross-ghosting analysis, with a simulated particle velocity signal, calculated in a lower frequency range from a recorded pressure signal using a time-varying filter based on the time-dependent arrival angle. Combined pressure and vertical particle velocity signals are generated by combining the recorded pressure signal and the merged particle velocity signals.

Figure 3:
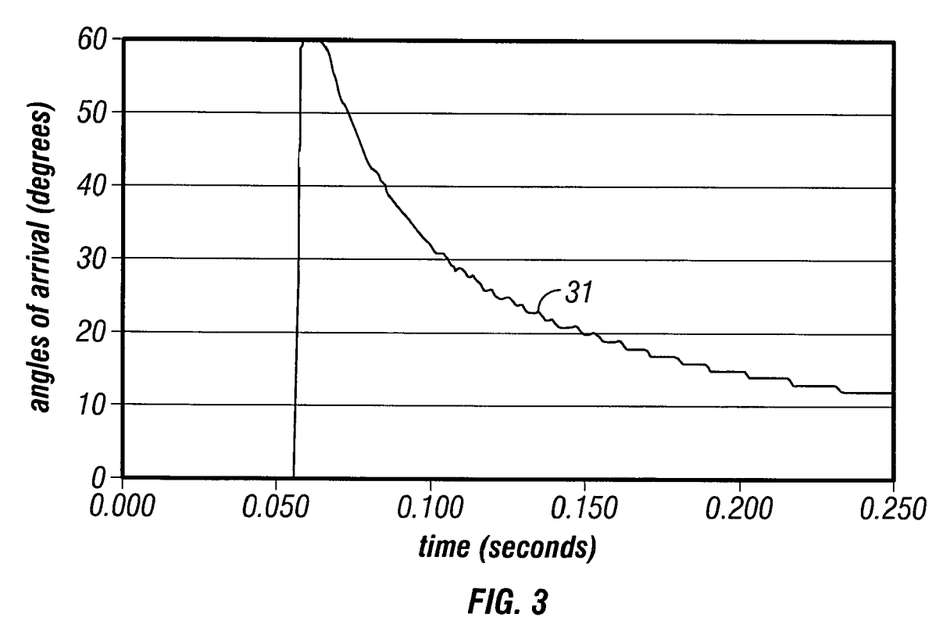
FIG. 3 is a plot of an example time-dependent vertical arrival angle.

FIG. 3 is a plot of an example time-dependent vertical arrival angle 31. The source-to-receiver offset for this actual field trace is approximately 90 meters. Note that arrival angle $\phi(t)$ 31 has been clipped to a maximum of 60 degrees, and the angles have been quantized to integer values for application of the method described herein.

Figure 4A:
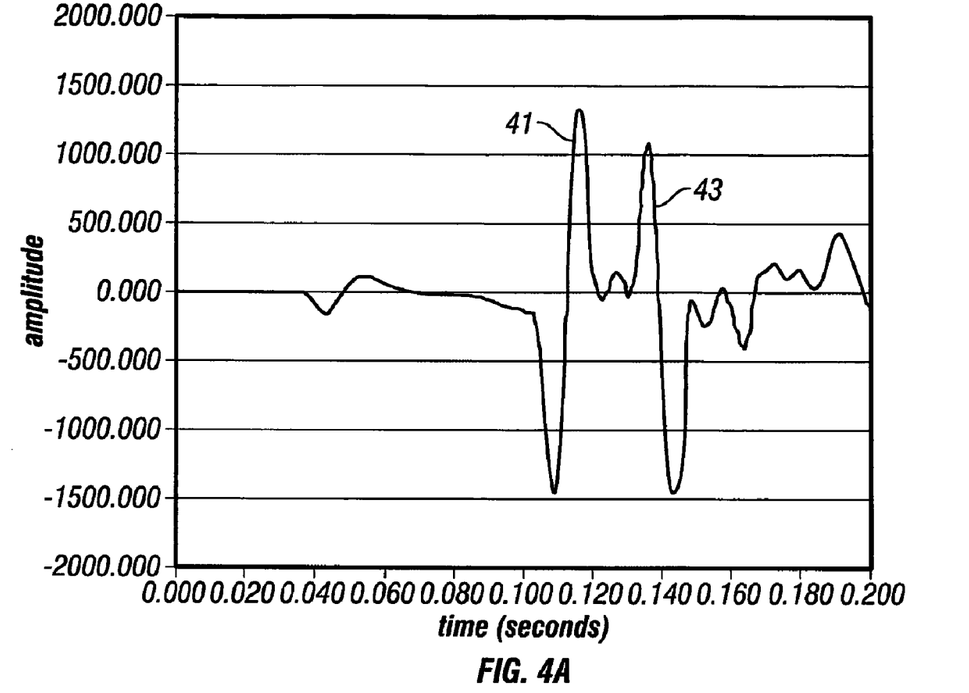
FIGS. 4A and 4B are plots of a pressure signal and a vertical particle velocity signal, respectively, corresponding to the arrival angle in FIG. 3.
Figure 4B:
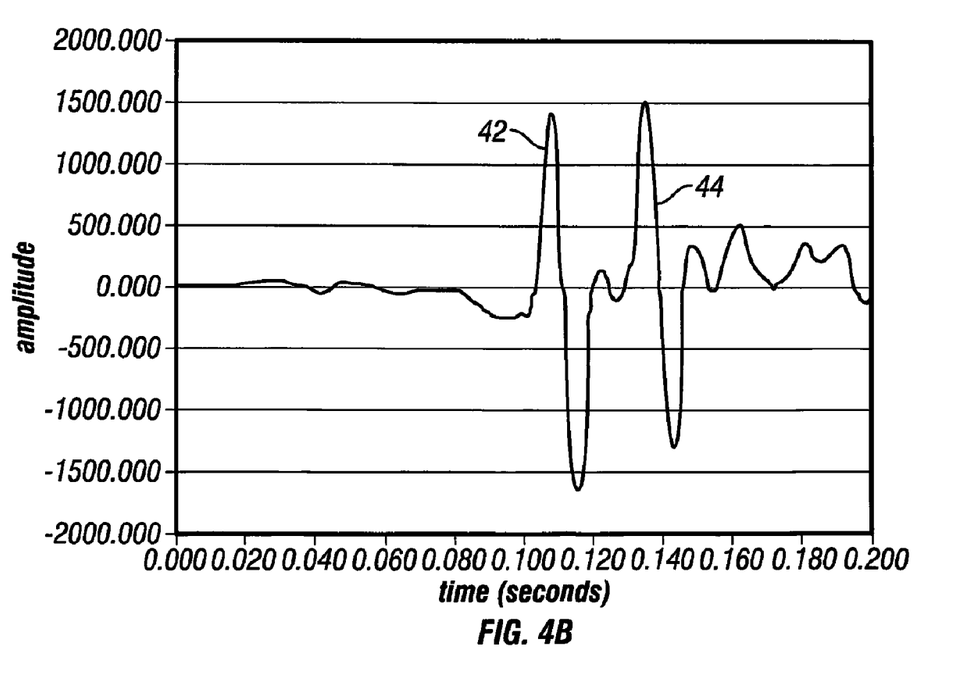

FIGS. 4A and 4B are the pressure signal 41 and the vertical particle velocity signal 42, respectively, corresponding to the arrival angle 31 displayed in FIG. 3. The vertical particle velocity signal 42 is corrected for non-vertical arrival angles. The signals are shown for recording times ranging from zero to 200 milliseconds.

The depth of this receiver station was 22 meters. The opposite-polarity ghost 43 on the pressure signal 41 and the same-polarity ghost 44 on the vertical particle velocity signal 42 can be seen, delayed by the vertical ghost reflection delay time of 29.33 milliseconds multiplied by the cosine of 31 degrees (the computed arrival angle for a reflection arriving at 100 milliseconds), yielding a ghost delay time of 25.4 milliseconds.

At block 23, the corrected particle velocity signal, $g_{ang}$, from block 22 is optionally corrected for tow noise, if necessary, generating a corrected vertical particle velocity signal, $g_c$.

A method for correcting for tow noise is described more fully in U.S. Pat. No. 7,359,283 B2, of Svein Vaage, et al.; entitled "System for Combining Signals of Pressure Sensors and Particle Motion Sensors in Marine Seismic Streamers"; issued Apr. 15, 2008; and assigned to an affiliated company of the assignee of the present invention. Vaage et al. describe a method for combining signals of a pressure sensor and a particle motion sensor recorded in a marine seismic streamer to reduce noise in the combined pressure sensor signal and particle motion sensor signal, the recorded pressure sensor signal having a bandwidth comprising a first frequency range and a second frequency range, the first frequency range being at lower frequencies than the frequencies of the second frequency range, and the recorded particle motion sensor signal having a bandwidth comprising at least the second frequency range. The method comprises calculating a particle motion sensor signal in the first frequency range from the recorded pressure sensor signal, thereby generating a simulated particle motion sensor signal in the first frequency range; merging the simulated particle motion sensor signal only in the first frequency range with the recorded particle motion sensor signal in the second frequency range to generate a merged particle motion sensor signal having substantially the same bandwidth as the bandwidth of the recorded pressure sensor signal, and combining the recorded pressure sensor signal and the merged particle motion sensor signal for further processing.

Next, in this embodiment of the method of the invention, the trace representing the upward traveling wave field, u(t), and the downward traveling wave field, d(t), are computed from the above traces h(t) and $g_c(t)$.

At block 24, an up-going pressure wavefield, u(t), is calculated from the corrected pressure signal, h(t), from block 21 and the corrected particle velocity signal, $g_c(t)$, from block 23. In one embodiment, the up-going pressure wavefield, u(t), is calculated by applying the following equation:

$$u(t) = \frac{h(t) - g_c(t)}{2}. \tag{6}$$

Figure 5A:
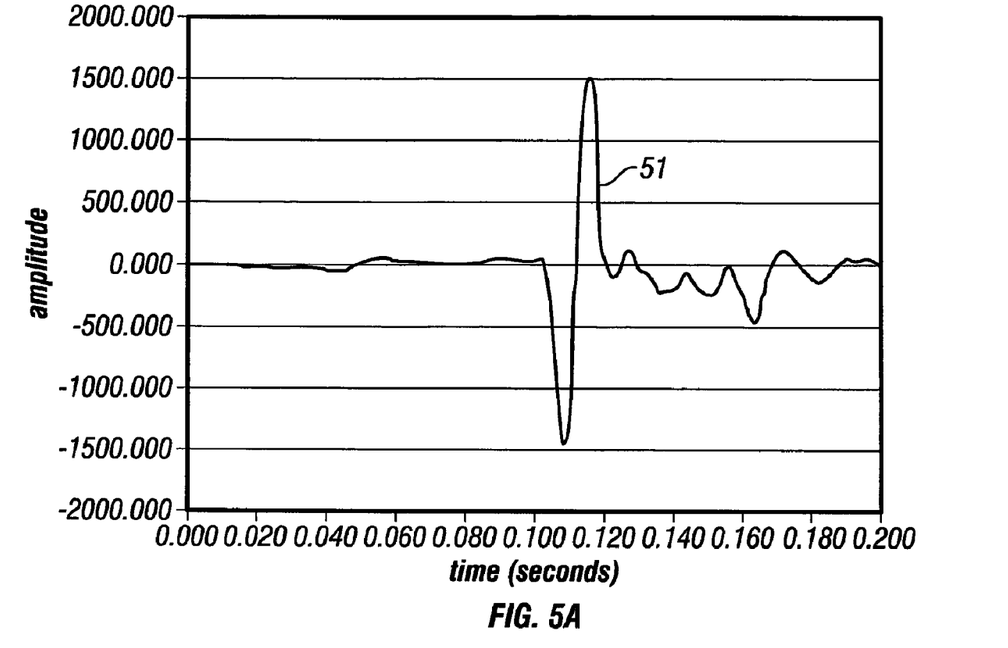
FIGS. 5A and 5B are plots of up-going and down-going pressure wavefields calculated from the pressure and vertical particle velocity signals shown in FIGS. 4A and 4B, respectively.

An example of such an up-going pressure wavefield 51 is shown in FIG. 5A. FIG. 5A is a plot of the up-going pressure wavefield 51 as calculated in Equation (6) from the corrected pressure signal 41 shown in FIG. 4A and the corrected particle velocity signal 42 shown in FIG. 4B.

At block 25, a down-going pressure wavefield, d(t), is calculated from the corrected pressure signal, h(t), from block 22 and the corrected particle velocity signal, $g_c(t)$, from block 24. In one embodiment, the down-going pressure wavefield, d(t), is calculated by applying the following equation:

$$d(t) = \frac{h(t) + g_c(t)}{2}. \tag{7}$$

Figure 5B:
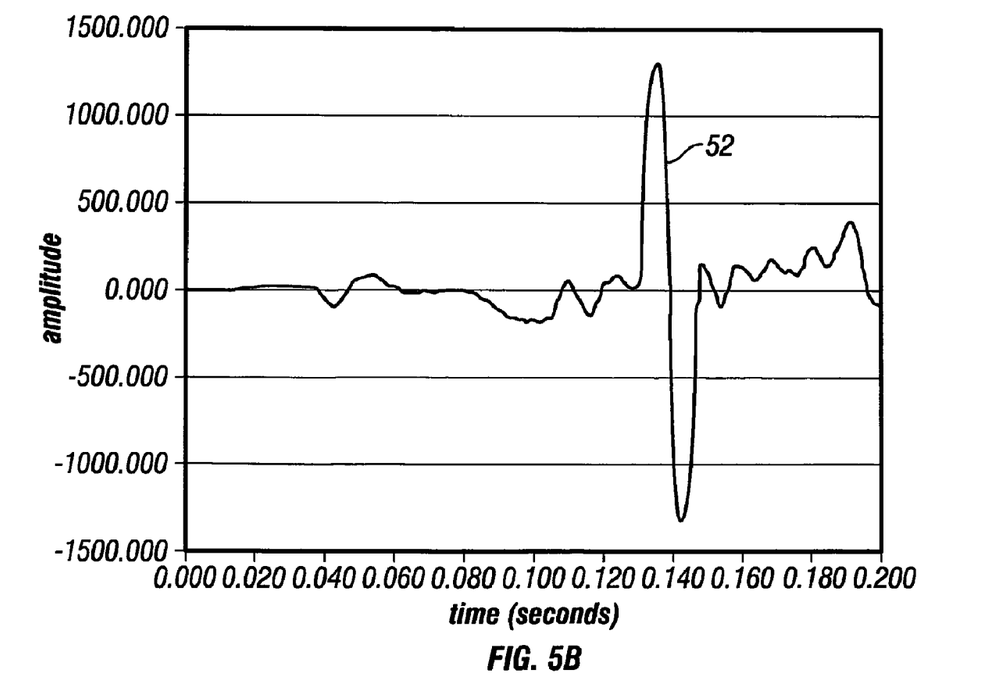

An example of such a down-going pressure wavefield 52 is shown in FIG. 5B. FIG. 5B is a plot of the down-going pressure wavefield 52 as calculated in Equation (7) from the corrected pressure signal 41 shown in FIG. 4A and the corrected vertical particle velocity signal 42 shown in FIG. 4B.

Figure 6:
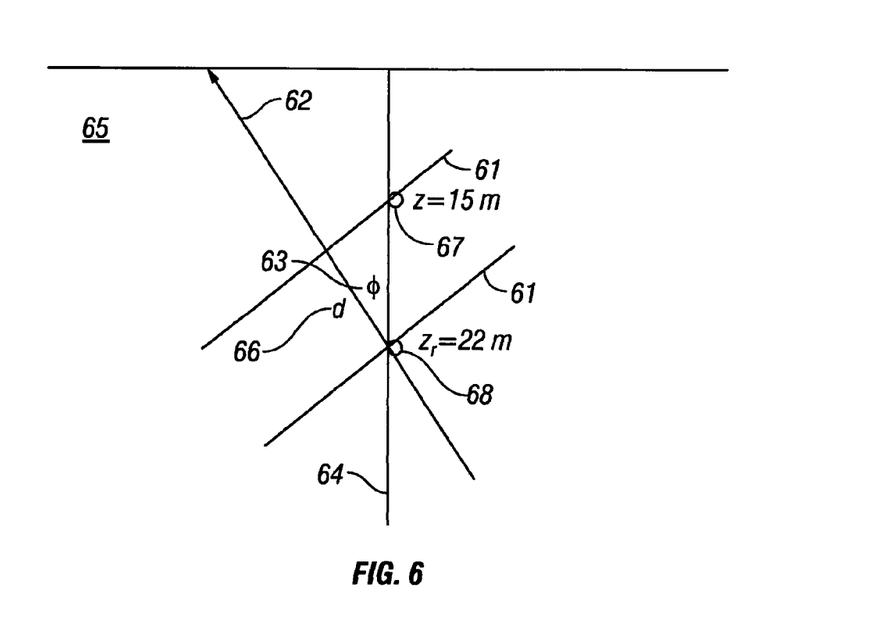
FIG. 6 is a schematic plan view of an extrapolated up-going wavefield with a non-vertical arrival angle.

FIG. 6 is a schematic plan view (not to scale) of an extrapolated up-going wavefield with a non-vertical arrival angle. FIG. 6 depicts an upward propagating reflection wave front 61 (with upward propagation direction indicated by arrow 62) arriving at an angle of φ degrees 63 from vertical 64. The geometry in FIG. 6 indicates that, in the time required to travel through the water 65 a distance of d meters 66, the reflection wave front 61 would arrive at a receiver at a depth of z=15 meters 67 instead of a depth $z_r$=22 meters 68. The delay time τ is given by:

$$\tau = \frac{d}{c}, \quad (8)$$

where d 66 is the distance traveled by the up-going reflection wave front 61 and c is acoustic wave propagation velocity in the water 65, which is typically 1500 meters/sec, and the arrival angle φ 63 is defined by:

$$\cos(\phi) = \frac{d}{z_r - z}. \quad (9)$$

Rewriting Equation (9) as:

$$d = \cos(\phi)(z_r - z) \quad (10)$$

and substituting Equation (10) into Equation (8) yields:

$$\tau = \cos(\phi)\frac{(z_r - z)}{c}. \quad (11)$$

Figure 7:
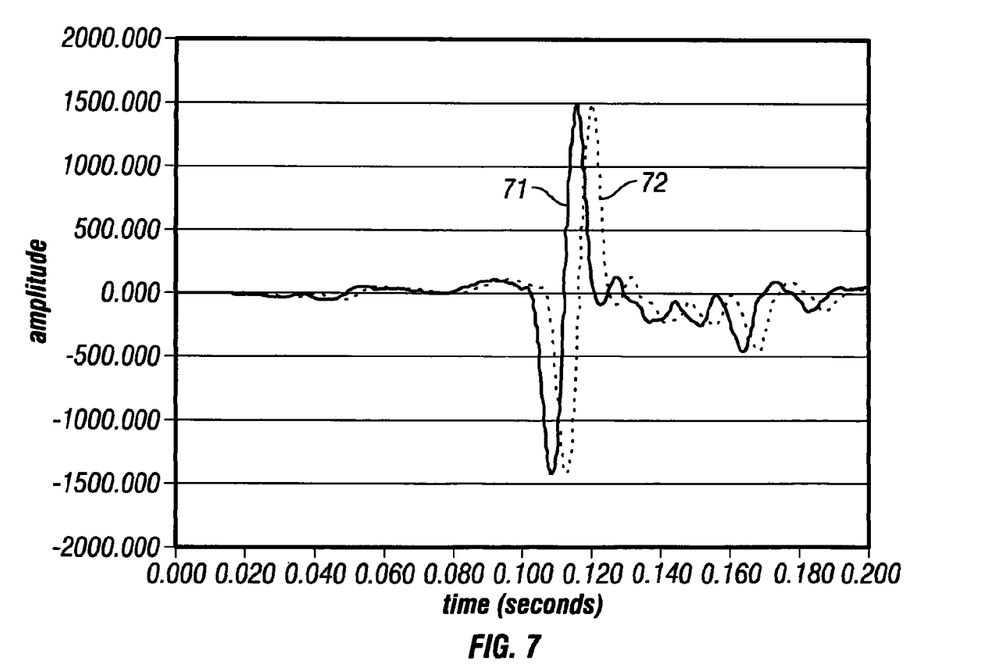
FIG. 7 is a plot of an extrapolated up-going pressure wavefield constructed according to the method of the invention.

FIG. 7 is a plot of an extrapolated up-going pressure wavefield 71 (solid line) constructed according to the method of the invention. The upward traveling wave field trace, extrapolated from a depth of 22 meters to one of 15 meters is formed by using, for each time sample, that sample from among the 61 traces that was delayed by the amount of time τ, corresponding most closely to the arrival angle φ(t) shown in FIG. 1. The result is shown in FIG. 7, along with that up-going pressure wave field 72 (dashed line) prior to extrapolation.

Figure 8:
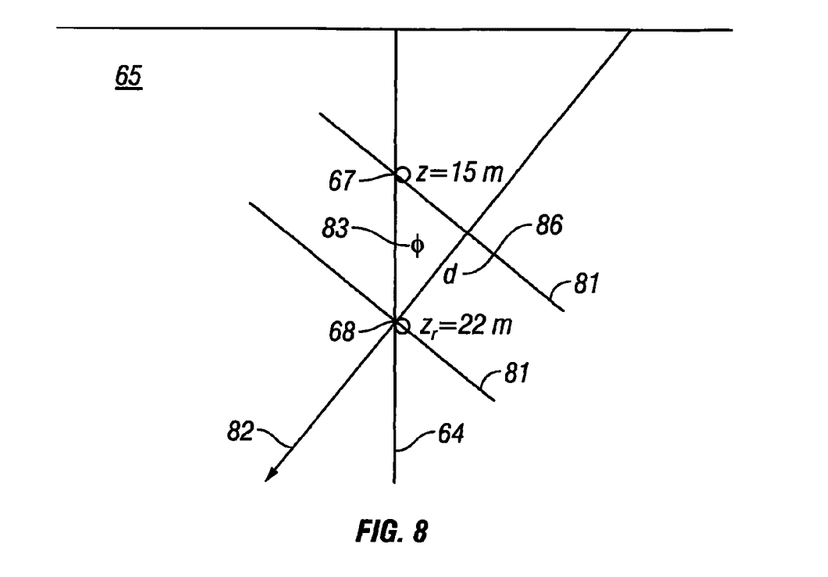
FIG. 8 is a schematic plan view of an extrapolated down-going wavefield with a non-vertical arrival angle.

FIG. 8 is a schematic plan view (not to scale) of an extrapolated down-going wavefield with a non-vertical arrival angle. FIG. 8 depicts a downward propagating reflection wave front 81 (with upward propagation direction indicated by arrow 82) arriving at an angle of φ degrees 83 from vertical 64. Similarly to the situation illustrated in FIG. 6, it can be seen that in the time required to travel through the water 65 a distance of d meters 86, the ghost reflection 81 of the reflection wave front 61 of FIG. 6 would arrive at a receiver positioned at a depth of 15 meters 67 earlier than at one positioned at 22 meters 68 by the same amount of delay time τ given in Equation (11).

FIG. 9 is a plot of an extrapolated down-going pressure wavefield 91 (solid line) constructed according to the method of the invention. Therefore, the downward traveling wave field trace, d(t), is moved earlier by the same amounts of time as u(t) is delayed, yielding 61 extrapolated, downward traveling wave field traces. And the downward traveling wave field trace, extrapolated from a depth of 22 meters to one of 15 meters, is formed by using, for each time sample, that sample from among the 61 traces that was moved earlier by the amount of time τ, corresponding most closely to the arrival angle φ(t) shown in FIG. 1. That result is shown in FIG. 9, along with that down-going pressure wave field 92 (dashed line) prior to extrapolation.

At block 26 of FIG. 2, the up-going pressure wavefield, u, from block 24 is extrapolated from the receiver depth, $z_r$, to another depth, z, generating an extrapolated up-going pressure wavefield, $u_{new}$.

At block 27 of FIG. 2, the down-going pressure wavefield, d, from block 25 is extrapolated from the receiver depth, $z_r$, to the other depth, z, generating an extrapolated down-going pressure wavefield, $d_{new}$.

FIG. 10 is a flowchart illustrating an embodiment of the invention for constructing extrapolated up-going and down-going pressure wavefields. FIG. 10 illustrates in more detail the portion of the invention discussed in blocks 26 and 27 of FIG. 2, above.

At block 100, a set of arrival angles $\{\phi_j\}$ is selected. The set of arrival angles $\{\phi_j\}$ is selected to cover a range of arrival angles, measured from vertical, expected to be encountered for reflection wavelets in the recorded pressure signals h(t) and vertical particle velocity signals g(t) obtained in block 21. The set of arrival angles $\{\phi_j\}$ may be designated as the set $\{\phi_j,$ for j=0, 1, 2, . . . , J} for some selected total number of arrival angles equal to J+1. In one example embodiment with J=60, a set of 61 arrival angles $\phi_j$ are equal to the set $\{\phi_j | \phi_j = j,$ for j=0, 1, 2, . . . , 60$\} = \{0°, 1°, 2°, \ldots, 60°\}$.

At block 101, a set of delay times $\{\tau_i\}$ is constructed from the set of arrival angles $\{\phi_j\}$ selected in block 100. In one embodiment, the set of delay times $\{\tau_i\}$ is constructed by applying the following equation, analogous to Equation (11):

$$\tau_j = \cos(\phi_j)\frac{z_r - z}{c}, \quad (12)$$

for each j=0, 1, 2, . . . , J. Here, $z_r$ is receiver depth, z is depth to which the wavefield is extrapolated, and c is speed of sound in the medium. In water, c is typically about 1500 m/s. In the example being illustrated, $z_r$=receiver depth=22 meters, z=depth to which to extrapolate wavefield=15 meters, and $\{\phi_j\}=\{0°, 1°, 2°, \ldots, 60°\}$. Thus, this method would yield 61 up-going wavefield traces.

At block 102, a set of up-going pressure wavefields $\{u_j(t)\}$ is constructed from the up-going pressure wavefield u(t) from block 22 of FIG. 2, using the set of time delays $\{\tau_i\}$ from block 101. In one embodiment, each up-going pressure wavefield $u_j(t)$ in the set of up-going pressure wavefields $\{u_j(t)\}$ is constructed by delaying the up-going pressure wavefield u(t) by the corresponding time delay $\tau_i$ from the set of time delays $\{\tau_i\}$, for each j=0, 1, 2, . . . , J.

At block 103, a set of down-going pressure wavefields $\{d_j(t)\}$ is constructed from the down-going pressure wavefield d(t) from block 22 of FIG. 2, using the set of time delays $\{\tau_i\}$ from block 31. In one embodiment, each down-going pressure wavefield $d_j(t)$ in the set of down-going pressure wavefields $\{d_j(t)\}$ is constructed by moving up the down-going pressure wavefield d(t) by the corresponding time delay $\tau_i$ from the set of time delays $\{\tau_i\}$, for each j=0, 1, 2, . . . , J.

At block 104, an extrapolated up-going pressure wavefield $u_{ext}(t)$ is constructed from the set of up-going pressure wavefields $\{u_j(t)\}$ from block 102. The extrapolated up-going pressure wavefield $u_{ext}(t)$ extrapolates the up-going pressure wavefield u(t) from the receiver depth $z_r$ to $u_{ext}(t)$ at depth z.

At block 105, an extrapolated down-going pressure wavefield $d_{ext}(t)$ is constructed from the set of down-going pressure wavefields $\{d_j(t)\}$ from block 103. The extrapolated downgoing pressure wavefield $d_{ext}(t)$ extrapolates the down-going pressure wavefield d(t) from the receiver depth $z_r$ to $d_{ext}(t)$ at depth z.

FIG. 11 is a flowchart illustrating an embodiment of the invention for constructing an extrapolated up-going pressure wavefield. FIG. 11 illustrates in more detail the portion of the invention discussed in block 104 of FIG. 10, above.

At block 110, a time sample is selected in the up-going pressure wavefield u(t) from block 22 of FIG. 2. Preferably, the time samples are selected in a systematic manner for computational efficiency, but this systematic manner of selection is not a requirement of the invention. In one embodiment, the time samples are selected sequentially, starting at one end of the seismic trace representing the up-going pressure wavefield u(t) and proceeding to the other end of the trace.

At block 111, the arrival angle ϕ(t) is determined that corresponds to the time sample selected in block 110.

At block 112, the delay time $\tau_i$ in the set of delay times $\{\tau_i\}$ constructed in block 101 of FIG. 10 is determined that corresponds most closely to the arrival angle ϕ(t) determined in block 111.

At block 113, the up-going pressure wavefield $u_j(t)$ in the set of up-going pressure wavefields $\{u_j(t)\}$ constructed in block 102 of FIG. 10 is determined that corresponds to the delay time $\tau_i$ determined in block 112.

At block 114, a time sample corresponding to the time sample selected in block 110 is extracted from the up-going pressure wavefield $u_j(t)$ determined in block 113.

At block 115, the time sample extracted from the up-going pressure wavefield $u_j(t)$ in block 114 is added to the extrapolated up-going pressure wavefield $u_{ext}(t)$.

At block 116, it is determined if any time samples remain in the up-going pressure wavefield u(t). If time samples remain, then the process returns to block 110 to select another time sample. If no time samples remain, then the process ends.

FIG. 12 is a flowchart illustrating an embodiment of the invention for constructing an extrapolated down-going pressure wavefield. FIG. 12 illustrates in more detail the portion of the invention discussed in block 105 of FIG. 10, above.

At block 120, a time sample is selected in the down-going pressure wavefield d(t) from block 22 of FIG. 2. Preferably, the time samples are selected in a systematic manner for computational efficiency, but this systematic manner of selection is not a requirement of the invention. In one embodiment, the time samples are selected sequentially, starting at one end of the seismic trace representing the down-going pressure wavefield d(t) and proceeding to the other end of the trace.

At block 121, the arrival angle ϕ(t) is determined that corresponds to the time sample selected in block 120.

At block 122, the delay time $\tau_i$ in the set of delay times $\{\tau_i\}$ constructed in block 101 of FIG. 10 is determined that corresponds most closely to the arrival angle ϕ(t) determined in block 121.

At block 123, the down-going pressure wavefield $d_j(t)$ in the set of up-going pressure wavefields $\{d_j(t)\}$ constructed in block 102 of FIG. 10 is determined that corresponds to the delay time $\tau_i$ determined in block 122.

At block 124, a time sample corresponding to the time sample selected in block 120 is extracted from the down-going pressure wavefield $d_j(t)$ determined in block 123.

At block 125, the time sample extracted from the down-going pressure wavefield $d_j(t)$ in block 124 is added to the extrapolated down-going pressure wavefield $d_{ext}(t)$.

At block 126, it is determined if any time samples remain in the down-going pressure wavefield d(t). If time samples remain, then the process returns to block 120 to select another time sample. If no time samples remain, then the process ends.

The invention overcomes spatial aliasing and receiver depth problems by providing a method that performs all operations on each corresponding pair of pressure and vertical particle velocity traces recorded at each streamer receiver station. Thus, the method of the invention does not require modifying the acquisition recording geometry to avoid spatial aliasing.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

I claim:

1. A method for geophysical prospecting, comprising:
   disposing a single receiver station in a dual-sensor streamer in a body of water;
   responsive to signals recorded at the receiver station, calculating seismic traces representing physical reflected wavefields in the body of water incident on the receiver station at a first depth;
   correcting for depth variations of the receiver station over time and for horizontal aliasing by transforming the seismic traces to produce pressure traces representing pressure wavefields as they would appear if incident on the receiver station at a second depth different from the first depth, the transforming comprising:
   determining a time-dependent arrival angle of the reflected wavefields;
   calculating up-going and down-going pressure traces from pressure and vertical particle velocity traces measured at the receiver station at the first depth;
   generating at least one of extrapolated up-going and down-going pressure traces at the second depth from the corresponding up-going and down-going pressure traces displaced by a time delay based upon the time-dependent arrival angle; and
   recording the extrapolated up-going or down-going pressure traces.

2. The method of claim 1, wherein the vertical particle velocity traces are obtained by using accelerometers to measure acceleration signals and determining vertical particle velocity traces from the measured acceleration signals.

3. The method of claim 1, wherein the vertical particle velocity traces are obtained by using velocity sensors to measure velocity signals and determining vertical particle velocity traces from the measured velocity signals.

4. The method of claim 1, wherein the calculating up-going and down-going pressure traces comprises:
   recording pressure signals h(t) and vertical particle velocity signals g(t) at a receiver station in the towed streamer;
   correcting the recorded pressure signals h(t) and vertical particle velocity signals g(t) for acquisition effects;
   calculating up-going and down-going pressure traces from the corrected pressure signals h(t) and vertical particle velocity signals g(t); and
   extrapolating the calculated up-going and down-going pressure traces from receiver depth $Z_r$ to another depth z.

5. The method of claim 4, wherein the correcting the recorded pressure signals h(t) and vertical particle velocity signals g(t) for acquisition effects comprises:

correcting the recorded pressure signals h(t) and vertical particle velocity signals g(t) for impulse response differences between sensors recording the signals;

correcting the previously corrected pressure signals h(t) and vertical particle velocity signals g(t) for effects of non-vertical arrival angles; and correcting the twice-corrected vertical particle velocity signals g(t) for effects of tow noise.

6. The method of claim 1, wherein the generating extrapolated up-going and down-going pressure traces comprises:

selecting a set of arrival angles $\{\phi_j\}$;

constructing a set of delay times $\{\tau_i\}$ from the set of arrival angles $\{\phi_j\}$;

constructing a set of up-going pressure wavefields $\{u_j(t)\}$ from the up-going pressure wavefield u(t) and the set of time delays $\{\tau_i\}$;

constructing a set of down-going pressure wavefields $\{d_j(t)\}$ from the down-going pressure wavefield d(t) and the set of time delays $\{\tau_i\}$;

constructing an extrapolated up-going pressure wavefield $u_{ext}(t)$ from the set of up-going pressure wavefields $\{u_j(t)\}$; and constructing an extrapolated down-going pressure wavefield $d_{ext}(t)$ from the set of down-going pressure wavefields $\{d_j(t)\}$.

7. The method of claim 6, wherein the set of arrival angles $\{\phi_j\}$ comprises the set of angles $\phi_j = 0°, 1°, 2°, \ldots, 60°$ degrees for $j=0, 1, 2, \ldots, 60$, respectively.

8. The method of claim 6, wherein the set of delay times $\{\tau_i\}$ is constructed from the set of arrival angles $\{\phi_j\}$ by applying the following equation:

$$\tau_j = \cos(\phi_j)\frac{z_r - z}{c},$$

for each $j=0, 1, 2, \ldots, J$, where $z_r$ is receiver depth, z is depth to which the trace is extrapolated, and c is speed of sound in the medium.

9. The method of claim 6, wherein the constructing an extrapolated up-going pressure trace $u_{ext}(t)$ comprises:

selecting a time sample from the up-going pressure trace wavefield u(t);

performing the following for the selected time sample;

determining an arrival angle $\phi(t)$ that corresponds to the selected time sample;

determining a delay time $\tau_i$ in the set of delay times $\{\tau_i\}$ that corresponds most closely to the determined arrival angle $\phi(t)$;

determining an up-going pressure trace $u_j(t)$ in the set of up-going pressure traces $\{u_j(t)\}$ that corresponds to the determined delay time $\tau_i$;

extracting a time sample from the determined up-going pressure trace $u_j(t)$ that corresponds to the selected time sample in the up-going pressure trace u(t); and adding the extracted time sample to the extrapolated up-going pressure trace $u_{ext}(t)$.

10. The method of claim 6, wherein the constructing an extrapolated down-going pressure trace $u_{ext}(t)$ comprises:

selecting a time sample from the down-going pressure trace d(t);

performing the following for the selected time sample;

determining an arrival angle $\phi(t)$ that corresponds to the selected time sample;

determining a delay time $\tau_i$ in the set of delay times $\{\tau_i\}$ that corresponds most closely to the determined arrival angle $\phi(t)$;

determining a down-going pressure trace $d_j(t)$ in the set of down-going pressure traces $\{d_j(t)\}$ that corresponds to the determined delay time $\tau_i$;

extracting a time sample from the determined down-going pressure traces $d_j(t)$ that corresponds to the selected time sample in the down-going pressure trace d(t); and adding the extracted time sample to the extrapolated down-going pressure trace $d_{ext}(t)$.

* * * * *